(12) United States Patent
Miyake et al.

(10) Patent No.: US 10,554,065 B2
(45) Date of Patent: Feb. 4, 2020

(54) BATTERY CONTROL APPARATUS

(71) Applicant: Hitachi, Ltd., Chiyoda-ku, Tokyo (JP)

(72) Inventors: Noriyuki Miyake, Tokyo (JP); Yasushi Tomita, Tokyo (JP); Tsutomu Kawamura, Tokyo (JP); Hirotaka Takahashi, Tokyo (JP); Kenichi Kuwabara, Tokyo (JP); Daisuke Hisajima, Tokyo (JP); Junichi Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 524 days.

(21) Appl. No.: 15/039,520

(22) PCT Filed: Sep. 10, 2014

(86) PCT No.: PCT/JP2014/073854
§ 371 (c)(1),
(2) Date: May 26, 2016

(87) PCT Pub. No.: WO2015/079769
PCT Pub. Date: Jun. 4, 2015

(65) Prior Publication Data
US 2017/0005483 A1    Jan. 5, 2017

(30) Foreign Application Priority Data
Nov. 29, 2013    (JP) .................. 2013-246896

(51) Int. Cl.
*H02J 7/00* (2006.01)
*G06Q 30/02* (2012.01)
*G06Q 50/06* (2012.01)

(52) U.S. Cl.
CPC .......... *H02J 7/007* (2013.01); *G06Q 30/0283* (2013.01); *G06Q 50/06* (2013.01); *H02J 7/0047* (2013.01); *H02J 2007/005* (2013.01)

(58) Field of Classification Search
CPC ...................................................... H02J 7/007
(Continued)

(56) References Cited

U.S. PATENT DOCUMENTS

| 2011/0231028 A1* | 9/2011 | Ozog .................... G06Q 10/06 700/291 |
| 2012/0078818 A1* | 3/2012 | Kumazawa ............ G06Q 50/06 705/412 |

(Continued)

FOREIGN PATENT DOCUMENTS

| CN | 102474115 A | 5/2012 |
| JP | 2004-48982 A | 2/2004 |

(Continued)

OTHER PUBLICATIONS

Chinese Office Action issued in counterpart Chinese Application No. 201480058080.4 dated Aug. 28, 2017 with English translation (14 pages).

(Continued)

*Primary Examiner* — Jerry D Robbins
(74) *Attorney, Agent, or Firm* — Crowell & Moring LLP (57) ABSTRACT

A battery control apparatus includes a reduced electricity cost analysis unit that obtains a discharge electric power cost at a discharge time and a charge electric power cost at a charge time of a battery, based on a basic cost and a unit cost of an electricity bill, and obtains a reduced electricity cost in which the charge electric power cost is subtracted from the discharge electric power cost for every discharge depth of the battery; an introduction cost analysis unit that calculates an introduction cost of the battery for every discharge depth of the battery; and a charge and discharge depth optimization unit that obtains a difference of the reduced electricity cost and the introduction cost for every discharge depth of the battery, and determines a charge and discharge depth of the (Continued)

battery based on the difference. The discharge of the battery is performed at the determined charge and discharge depth.

9 Claims, 9 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 2012/0150709 A1* | 6/2012 | Kaji | ....................... | G06Q 40/00 705/35 |
| 2013/0024042 A1* | 1/2013 | Asghari | .................. | H02J 3/381 700/295 |
| 2013/0079939 A1* | 3/2013 | Darden, II | .......... | H02J 13/0013 700/291 |
| 2014/0058571 A1* | 2/2014 | Hooshmand | ........... | G05B 15/02 700/286 |
| 2014/0139191 A1* | 5/2014 | Asghari | ................ | H01M 10/48 320/134 |

FOREIGN PATENT DOCUMENTS

| | | |
|---|---|---|
| JP | 2009-194947 A | 8/2009 |
| WO | WO 2011/142114 A1 | 11/2011 |

OTHER PUBLICATIONS

International Search Report (PCT/ISA/210) issued in PCT Application No. PCT/JP2014/073854 dated Nov. 25, 2014 with English translation (Two (2) pages).

Japanese-language Written Opinion (PCT/ISA/237) issued in PCT Application No. PCT/JP2014/073854 dated Nov. 25, 2014 (Three (3) pages).

* cited by examiner

BATTERY CONTROL APPARATUS

BACKGROUND OF THE INVENTION

Field of the Invention

The present invention relates to a battery control apparatus.

Background Art

A life span of a battery depends on the discharge depth of the battery, that is, whether or not discharge is repeated at any degree of depth in a fully charged state. For example, even when the discharge is repeated at a deep depth in a lithium battery, it is possible to improve cycle characteristics by repeating shallow discharge. Accordingly, in the related art, when the battery is used in the reduction of electric power demand of customer facilities in an energy management system, the discharge is performed by decreasing the charge and discharge depth. However, when the increment of the electric power demand is predicted, there is a need to improve discharge output by increasing the charge and discharge depth in order to increase the amount of reduction in the electric power demand. There is JP-A-2009-194947 as a background technology of the art. JP-A-2009-194947 describes that the charge and discharge depth is changed according to the increment and decrement of the electric power demand. In addition, WO2011/142114 describes that the charge and discharge depth is appropriately determined by considering the cost difference of a deterioration cost and an electric power price based on life span characteristics of a battery.

SUMMARY OF THE INVENTION

In JP-A-2009-194947, a charge and discharge management apparatus and a method for changing the charge and discharge depth according to increment and decrement of the electric, power demand are described. However, it is difficult to maximize cost benefits of the battery in a case or the like where since a life span of the battery and an electricity unit cost which is set higher than a normal state at a time in which supply of the electric power is tight are not considered, a difference of an electricity bill with respect to an introduction cost of the battery decreases by discharge of the battery.

In addition, in WO2011/142114, a power storage system for determining the charge and discharge depth by considering the life span characteristics of a battery and the cost difference of the electric power is described. However, since a reduction of a basic cost of electricity according to cutting of the peak of the electric power demand by discharging is not considered, it is difficult to maximize cost benefits of the battery.

An object of the present invention is to provide a battery control apparatus capable of maximizing cost benefits of a battery by optimizing a charge and discharge depth when electric power demand of customer facilities in the battery is reduced.

For example, in order to achieve the above object, a configuration described in an aspect is employed. The invention includes a plurality of means for solving the above problems. According to an aspect of the present invention, there is provided a battery control apparatus including a reduced electricity cost analysis unit that obtains a discharge electric power cost at a discharge time and a charge electric power cost at a charge time of a battery, based on a basic cost and a unit cost of an electricity bill, and obtains a reduced electricity cost in which the charge electric power cost is subtracted from the discharge electric power cost for every discharge depth of the battery; an introduction cost analysis unit that calculates an introduction cost of the battery for every discharge depth of the battery; and a charge and discharge depth optimization unit that obtains a difference of the reduced electricity cost and the introduction cost for every discharge depth of the battery, and determines a charge and discharge depth of the battery based on the difference. The discharge of the battery is performed at the determined charge and discharge depth.

According to the invention, it is possible to provide a battery control apparatus maximizing cost benefits of a battery by optimizing a charge and discharge depth of the battery when electric power demand of customer facilities in the battery is reduced. Objects, configurations, and effects other than those described above will become apparent from the following description of embodiments.

DETAILED DESCRIPTION OF THE INVENTION

First Embodiment

Figure 1:
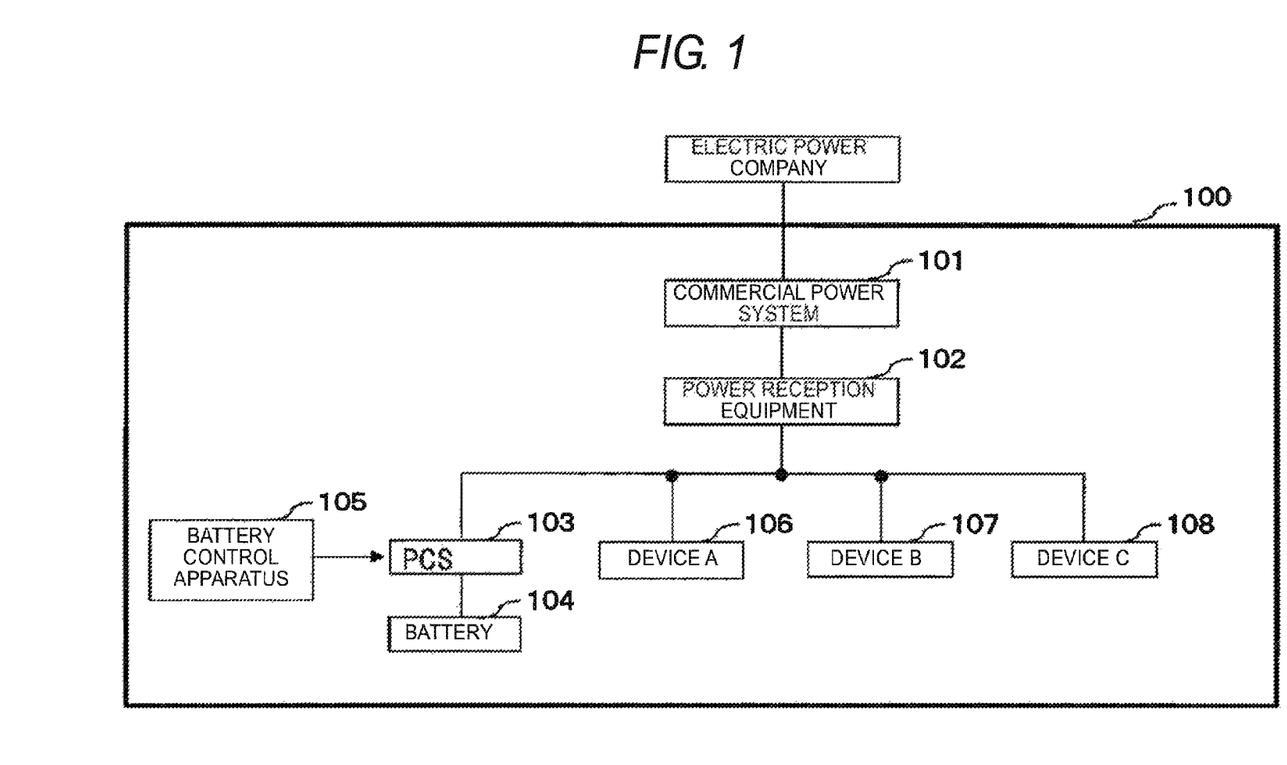
FIG. 1 is an example of a configuration diagram of electric power equipment of customer facilities and devices within the FIG. 2 is an example of a configuration diagram of a battery control apparatus

FIG. 1 is a configuration diagram of electric power equipment of customer facilities and devices within the facilities according to an embodiment of the invention.

As illustrated in FIG. 1, a customer facility 100 includes a commercial power system 101, power reception equipment 102, a power conditioning system (PCS) 103, a battery 104, a battery control apparatus 105, a device A 106, a device B 107, and a device C 108.

The commercial power system 101 includes electric power supplied from thermal power generation, hydroelectric power generation, nuclear power generation, wind power generation, or the like of electric power companies, or the like to a customer The power reception equipment 102 is equipment of converting the electric power supplied from the commercial power system 101 to the customer facility into electricity suitable for devices of the customer facility.

The PCS 103 is a device provided in the battery 104, and a device of converting AC electric power from the power reception equipment into DC electric power suitable for the battery, or the DC electric power discharged from the battery 104 into the AC electric power.

The battery 104 is a device of storing the electric power from the power reception equipment, and discharges the electric power to the device A 106, the device B 107, and the device C 108 through the PCS 103, if necessary.

The battery control apparatus 105 transmits a control instruction to the PCS 103, and controls charge and discharge of the battery 104 based on the control instruction. The battery control apparatus 105 may be installed within the customer facility, or may be installed outside the customer facility through a network such as the Internet, and the like.

The device A 106, the device B 107, and the device C 108 are loads installed within the customer facility. For example, the devices are air conditioning devices, lighting devices, or the like. The devices can be operated by the electric power received to the power reception equipment 102, or the electric power discharged from the battery 104. At this time, the device A 106, the device B 107, and the device C 108 may be different types of devices, or may be the same devices. In addition, the invention is not limited to the three devices, may also be one device, and may be three or more devices.

Figure 2:
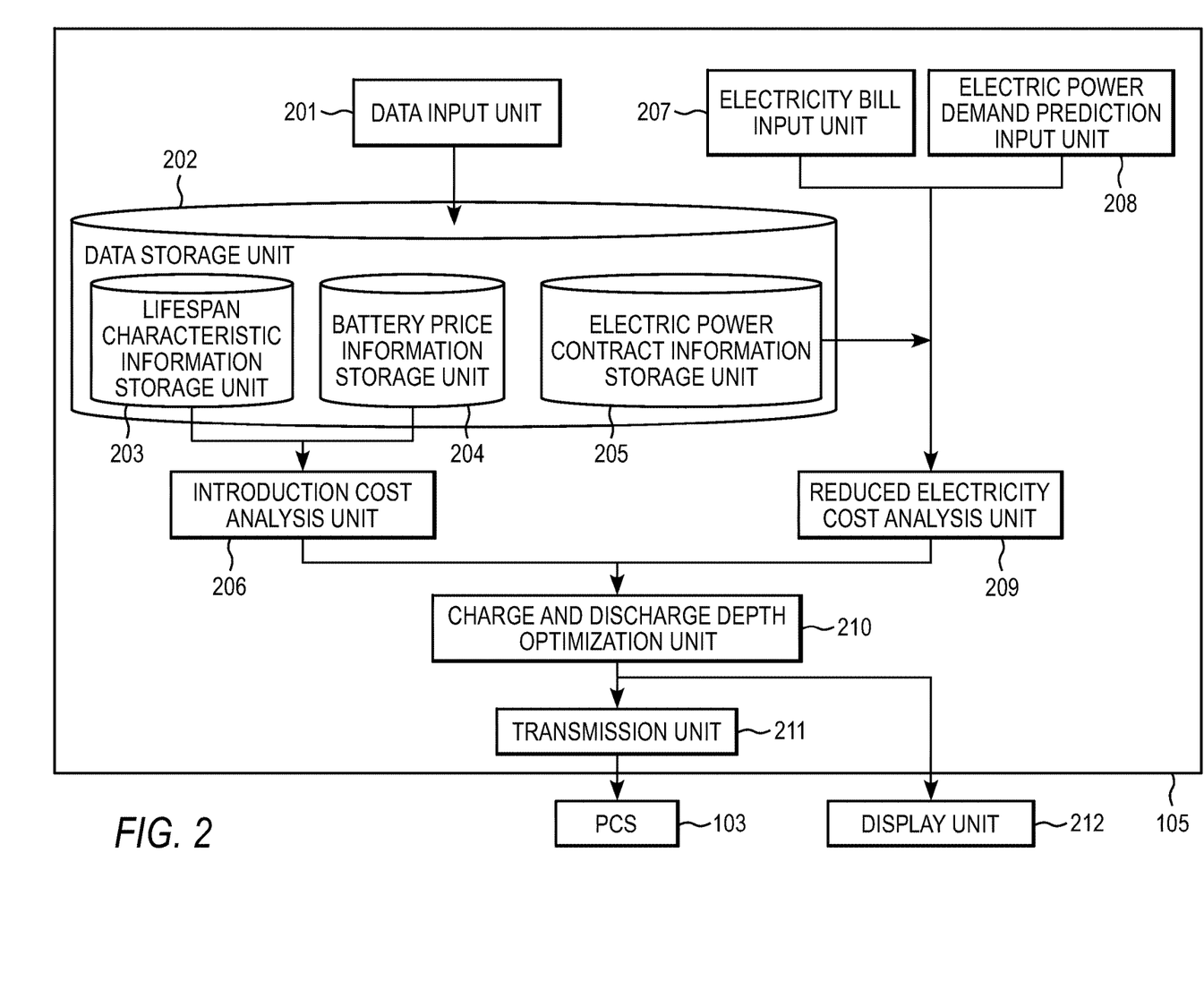

FIG. 2 is an example of a configuration diagram of the battery control apparatus 105.

As illustrated in FIG. 2, the battery control apparatus 105 includes a data input unit 201, a data storage unit 202, a life span characteristic information storage unit 203, a battery price information storage unit 204, an electric power contract information storage unit 205, an introduction cost analysis unit 206, an electricity bill input unit 207, an electric power demand prediction input unit 208, a reduced electricity cost analysis unit 209, a charge and discharge depth optimization unit 210, a transmission unit 211, and a display unit 212.

The data input unit 201 receives the life span characteristics of the battery and price information of the battery required for calculating an introduction cost of the battery, receives information, or the like of contract electric power of customer facilities required for calculating a reduced electricity cost from outside, and stores the received information in the data storage unit 202. A method for obtaining the introduction cost of battery and the reduced electicity cost will be described below.

The data storage unit 202 includes the life span characteristic information storage unit 203, the battery price information storage unit 204, and the electric power contract information storage unit 205.

First, the life span characteristic information storage unit 203 stores characteristic information of the battery indicating a relationship between charge and discharge depth of the battery and the life span of the battery. The characteristic information of the battery may continuously use information that is first stored, or may be updated in the middle of operation.

Next, the battery price information storage unit 204 stores cost information when the battery is introduced in the customer facility. The cost information may include not only a purchase cost of the battery but also construction costs, installation costs, or the like.

In addition, the electric power contract information storage unit 205 includes information of an electric power contract between an electric power company and the customer. For example, the information includes a basic cost of electricity, contract electric power, a contract plan, a unit cost, or the like.

The characteristic information of the battery in the life span characteristic information storage unit 203 and information relating to a cost when the battery of the battery price information storage unit 204 is introduced in a customer facility are output to the introduction cost analysis unit 206.

The introduction cost analysis unit 206 calculates the introduction cost of the battery per day for every discharge depth based on information of the life span characteristics of the battery obtained from the life span characteristic information storage unit 203 and the introduction cost of the battery obtained from the battery price information storage unit 204. Specifically, a value obtained by dividing the introduction cost of the battery by the life span characteristics of the battery, becomes the introduction cost.

Here, the introduction cost of the battery will be described using FIG. 3 and FIG. 4.

Figure 3:
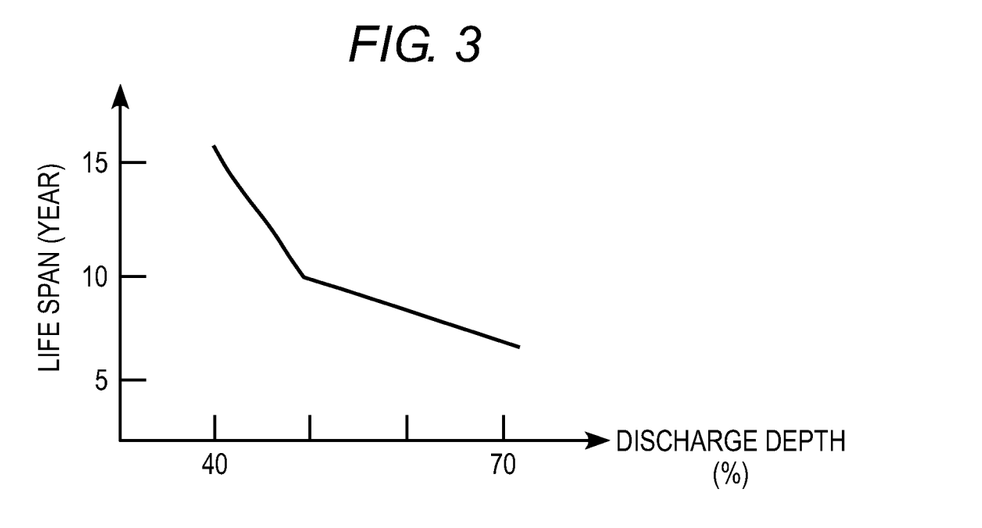
FIG. 3 is an example of a diagram illustrating a life span corresponding to discharge depth.

FIG. 3 is a diagram illustrating a life span obtained from the life span characteristics of the battery with respect to the discharge depth.

In many cases, it is known that the life span becomes longer, as the discharge depth becomes smaller, and the life span becomes shorter, as the discharge depth becomes longer. However, since the discharge depths are different according to the life span characteristics of battery, this tendency is not limited to a certain battery. In FIG. 3, for example, in a case where the battery is operated to reach the life span by setting the discharge depth to 50%, information that the life span of battery is ten years can be obtained. The life span characteristics may be input as new information from a data input unit 201, when characteristics are changed according to a usage situation, and may change the life span characteristics by predicting a change of characteristics.

Figure 4:
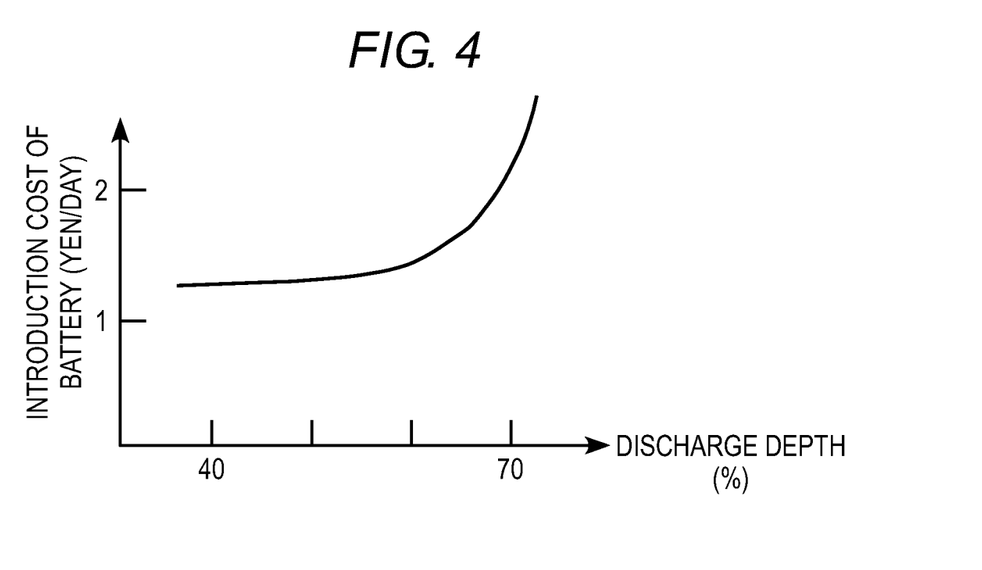
FIG. 4 is a diagram illustrating an example of an introduction cost of a battery per day for the discharge depth.

FIG. 4 is a diagram illustrating an example of the introduction cost of battery per day for the depth of discharge.

In FIG. 4, in a case where the discharge depth is operated at 50%, the introduction cost of the battery input from the battery price information storage unit 204 is divided by a life span being 10 years and the introduction cost per day being 12,000 yen, and in a case where the discharge depth is operated at 70%, the introduction cost is divided by a life span being 6 years and then the introduction cost per day is calculated as 20,000 yen. The calculated introduction cost is output to the charge and discharge depth optimization unit 210.

Figure 5:
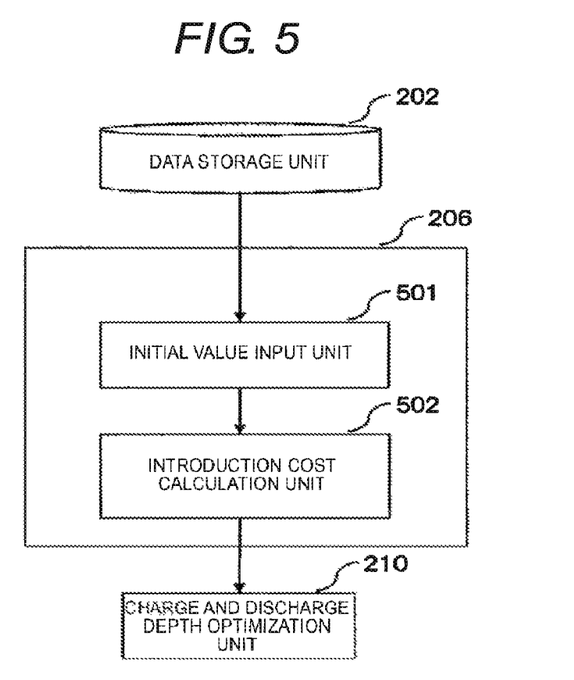
FIG. 5 is an example of a configuration diagram of an introduction cost analysis unit.

FIG. 5 is an example of a configuration diagram of the introduction cost analysis unit 206.

The introduction cost analysis unit 206 includes an initial value input unit 501 and an introduction cost calculation unit 502. The introduction cost of the battery stored in the battery price information storage unit 204 of the data storage unit 202 and information of the life span characteristics of the battery stored in the life span characteristic information storage unit 203 are input to the initial value input unit 501.

Next, the introduction cost calculation unit 502 calculates the introduction cost of the battery per day for every discharge depth based on information input to the initial value input unit 501. Specifically, a value obtained by dividing the introduction cost of the battery by the life span characteristics of the battery is the introduction cost, and is calculated for every discharge depth. The calculated introduction cost of the battery is output to the charge and discharge depth optimization unit 210.

Figure 6:
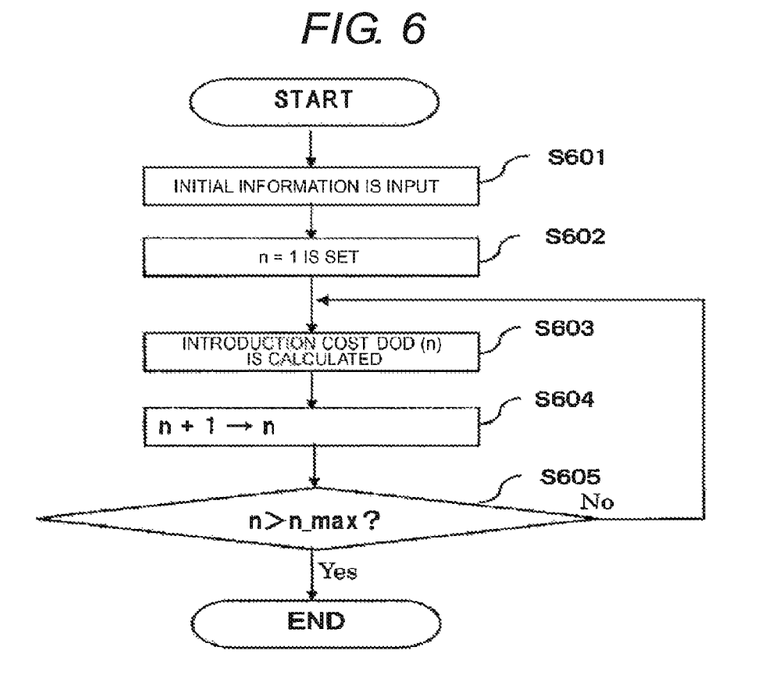
FIG. 6 is an example of a flow chart diagram illustrating processing until the introduction cost analysis unit calculates the introduction cost per day.

FIG. 6 is an example of a flow chart diagram illustrating processing by which the introduction cost analysis unit 206 calculates the introduction cost of the battery per day.

In step 601, the life span characteristics of battery and the introduction cost are input to the initial value input unit 501, as ins al information.

In step 602, when the introduction cost is obtained for every discharge depth in the introduction cost analysis unit. 206, n=1 is set as t e discharge depth DOD (n) obtained first. Here, a minimum value of n is 1 and a maximum value thereof is n_max. In addition, a difference between DOD (n) and DOD (n+1) may be 1% and may be 10%. However, a value of DOD (n) is set between equal to or greater than the minimum value and equal to or less than the maximum value of the discharge depth determined by the characteristics of the battery. For example, in a case where the minimum value of the discharge depth is 20% and the maximum value is 100%, DOD (1) is set equal to or greater than 20% and DOD (n_max) is set equal to or less than 100%.

In step 603, the introduction cost per day of the time of DOD (n) is calculated in the introduction cost analysis unit 206. For example, when the introduction cost of battery is P yen and the life span is given as L years at the time of DOD (n) of the discharge depth, the introduction cost C per day is C=P/L/365 yen/day.

In step 604, in the introduction cost analysis unit 206, n+1 is substituted for n in order to select the discharge depth to be calculated next.

In step 605, it is determined whether or not the n exceeds the maximum value n_max in the introduction cost analysis unit 206. When the n does not exceed the maximum value n_max, the processing returns to step 603 and then is repeated. Meanwhile, when the n exceeds the maximum value n_max, the processing is finished.

By performing the above steps, it is possible to calculate the introduction cost of battery per day for every discharge depth in the introduction cost analysis unit 206. The introduction cost of battery is obtained from data illustrated in FIG. 4 as described above.

Returning to FIG. 2, the electricity bill input unit 207, the electric power demand prediction input unit. 208, and the reduced electricity cost analysis unit 209 will be described.

First, the electricity bill input unit 207 receives the hourly electricity unit cost from outside. The hourly electricity unit cost may be input daily, and may be input from outside only when there is a change, while the unit cost is stored in the electric power contract information storage unit 205 of the data storage unit 202.

In addition, the electric power demand prediction input unit 208 receives a predicted value of daily electric power demand of the customer facility. In this case, data of the predicted value may be input from outside, and may use a value obtained by calculating a predicted value within the battery control apparatus 105.

A basic cost and a unit cost of electricity output from the electricity bill input unit. 207, and predicted demand of the electric power output from the electric power demand prediction input unit 208 are input to the reduced electricity cost analysis unit 209. In addition, information of an electric power contract between an electric power company and the customer is also input from the electric power contract information storage unit 205. The reduced electricity cost analysis unit 209 calculates the reduced electricity cost for every discharge depth based on the information. By implementing the configuration, since the reduced electricity cost can be obtained by also considering the basic cost, it is possible to create a charge and discharge plan so as to maximize the reduced electricity cost.

Figure 7:
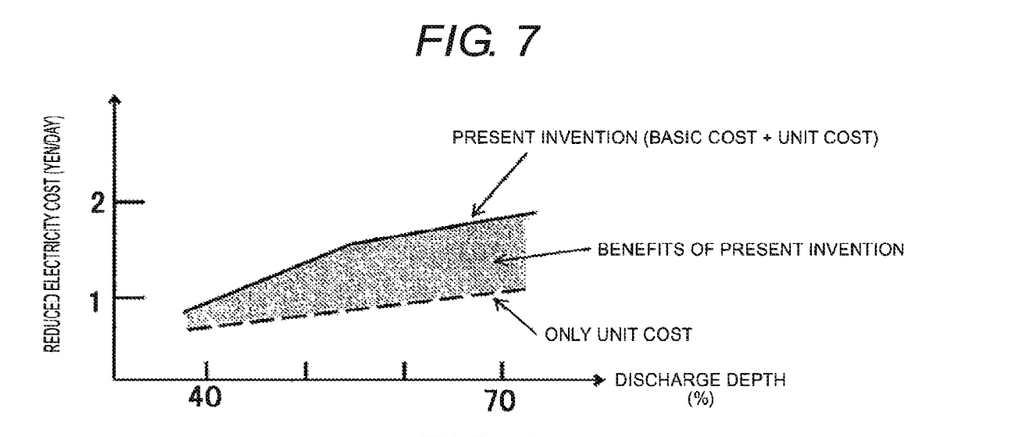
FIG. 7 is a diagram illustrating an example of a reduced electricity cost obtained by charge and discharge.

FIG. 7 is a diagram illustrating the reduced electricity cost obtained by charge and discharge calculated in the reduced electricity cost analysis unit 209 according to the invention.

In FIG. 7, the reduced electricity cost is illustrated by a solid line in the invention considering the basic cost and the unit cost, and the reduced electricity cost considering only the unit cost is illustrated by a dashed line. In the reduced electricity cost according to the invention, for example, the reduced electricity cost in a case of the discharge depth of 40% may be 10,000 yen, and the reduced electricity cost in a case of the discharge depth of 70% may be 18,000 yen. The calculated reduced electricity cost is output to the charge and discharge depth optimization unit 210. Since the amount of discharge increases, as the discharge depth becomes larger, the reduced electricity cost increases. The reduced electricity cost may be obtained from only a reduced cost of the basic cost of electricity, may be obtained from a reduced cost of the amount of electric power obtained from the cost difference of the unit cost, and may be obtained using both the basic cost of electricity and a reduced cost of the amount of electric power. In view of the fact that the basic cost of electricity is changed by cutting the peak of the electric power, the invention preferably adopts a configuration using costs of the basic cost and the unit cost when calculating the reduced electricity cost.

However, the dashed line of FIG. 7 indicates the reduced electricity cost considering only the unit cost. When considering only the unit cost, it is difficult to calculate the reduced electricity cost in anticipation of the reduction of the basic cost. Therefore, as illustrated in FIG. 7, since a difference of the reduced electricity cost illustrated by the solid line and the reduced electricity cost illustrated by the dashed line is generated, it is difficult to accurately obtain the reduced electricity cost when the reduced electricity cost considering only the unit cost is used.

Since the reduced electricity cost is calculated for every discharge depth, different methods for calculating a reduced cost can be used according to the discharge depth. For example, the reduced electricity cost may be obtained from only a reduced cost of the basic cost of electricity may be obtained at the time of the discharge depth of 40%, and the reduced electricity cost considering both the basic cost of electricity and the cost of the amount of electric power may be obtained at the time of the discharge depth of 70%.

Figure 8:
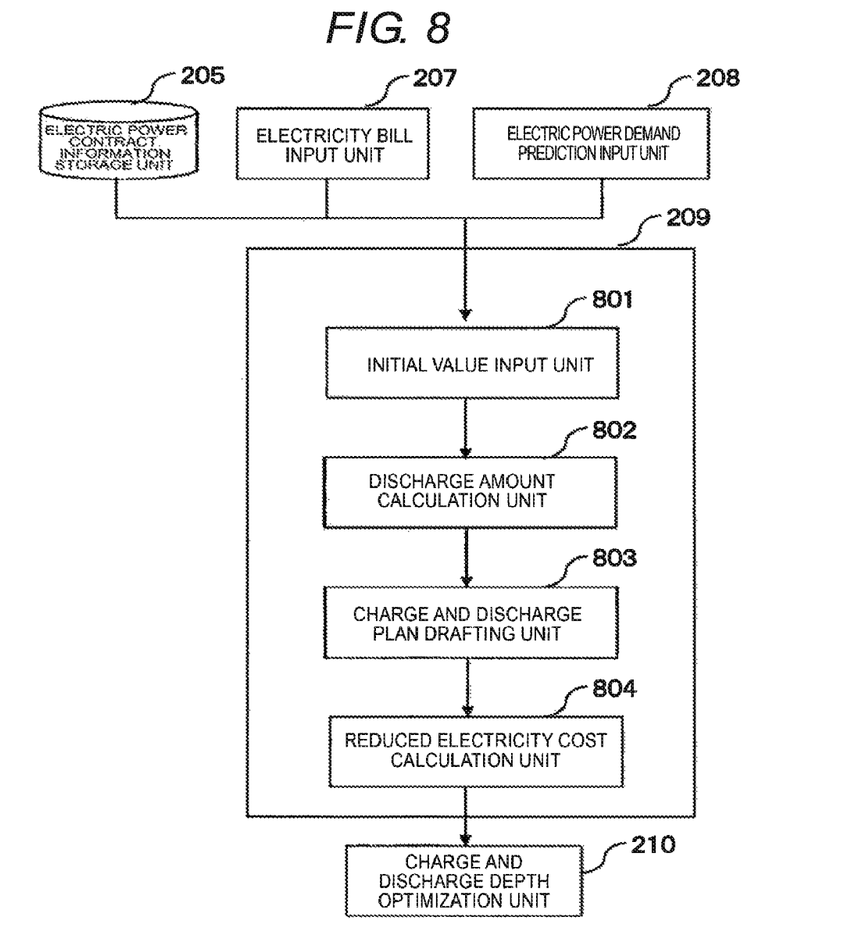
FIG. 8 is an example of a configuration diagram of a reduced electricity cost analysis unit.

FIG. 8 is an example of a configuration diagram of the reduced electricity cost analysis unit 209.

The reduced electricity cost analysis unit 209 includes an initial value input unit 801, a discharge amount calculation unit 802, a charge and discharge plan drafting unit 803, and a reduced electricity cost calculation unit 804.

Information such as a prediction value of electric power demand, the basic cost and the unit cost of electricity, contract electric power, and the like output from the electric power contract information storage unit 205, the electricity bill input unit 207, and the electric power demand prediction input unit 208 is input to the initial value input unit 801. In addition, the information is output to the discharge amount calculation unit 802.

The discharge amount calculation unit 802 calculates the amount of discharge capable of actually being discharged for every value of the discharge depth of the battery.

Next, the charge and discharge plan drafting unit 803 calculates a charge or discharge time and the amount of charge or discharge in the time so as to maximize the reduced electricity cost at a certain discharge depth based on information input to the initial value input unit 801. For example, when it is expected that the peak of electric power demand on the next day of demand prediction exceeds the current contract electric power, a charge and discharge plan is drafted to cut the peak of electric power demand. In this manner, it is possible to suppress the increment of the basic cost by discharging the battery to cut the peak of the electric power demand.

In addition, for example, when the difference of the hourly electricity unit cost is large, a charge and discharge plan is drafted such that charging is performed at a time in which the electricity unit cost is relatively cheap compared to of times, and discharging is performed at a time in which the electricity unit cost is relatively high compared to other times. With this, it is possible to reduce a cost of the amount of electric power from the difference of the electricity unit cost. In addition, a charge and discharge plan is drafted by considering both of reduction of the basic cost by the peak cut of the electric power demand and reduction of the amount of electric power based on the difference of electricity unit cost. The charge and discharge plan may be drafted by the battery control apparatus 105, or may be given by a plan from outside.

The reduced electricity cost calculation unit 80 calculates a reduced cost of the electricity bill based on the charge and discharge plan drafted in the charge and discharge plan drafting unit 803. Specifically, the reduced cost is a cost obtained by subtracting the electricity bill to be paid in the charge from the electricity bill which can be reduced in the discharge. Here, as described above, the electricity bill is considered as the basic cost based on the contract electric power and the cost of the amount of electric power based on the used amount of electric power.

As described above, the reduced electricity cost obtained in the reduced electricity cost analysis unit 209 is output to the charge and discharge depth optimization unit 210.

Figure 9:
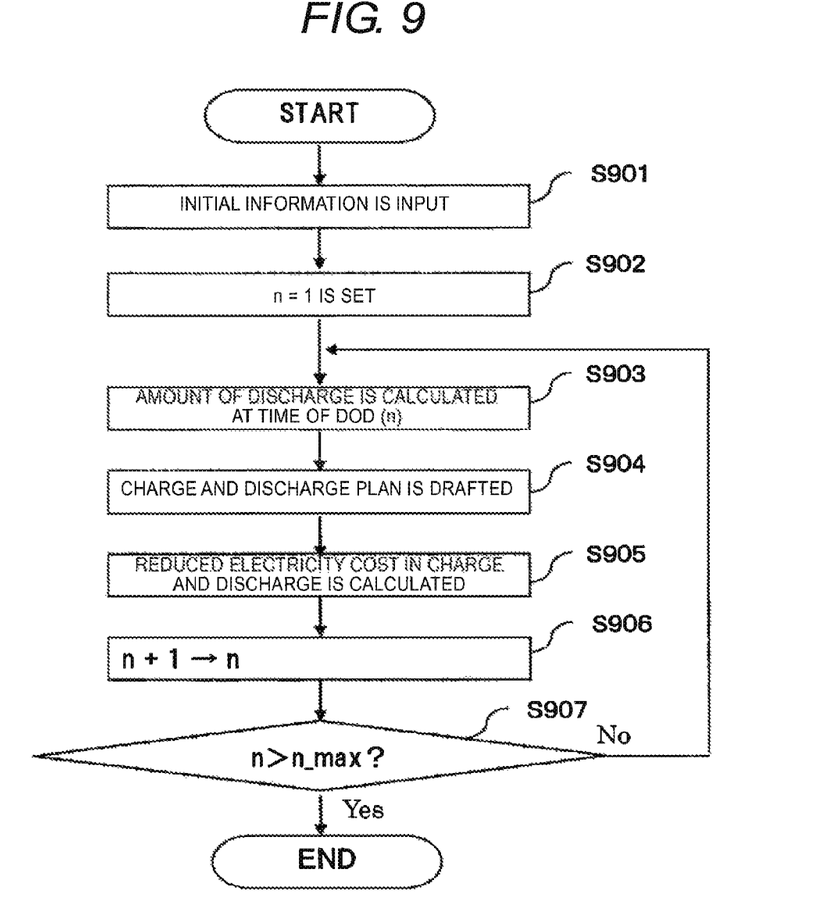
FIG. 9 is an example of a flow chart diagram illustrating processing until the reduced electricity cost analysis unit calculates the reduced electricity cost.

FIG. 9 is an example of a flow chart illustrating processing for calculating the reduced electricity cost by the reduced electricity cost analysis unit 209.

In step 901, information of the contract electric power output from the electric power contract information storage unit 205, information of the basic cost and the unit cost of electricity output from the electricity bill input unit 207, and a prediction value of the electric power demand output from the electric power demand prediction input unit 208 are input to the initial value input unit 801.

In step 902, when the reduced electricity cost is obtained for every discharge depth in the discharge amount calculation unit. 802, n=1 is set as the discharge depth DOD (n) first obtained. Here, the minimum value of n is 1 and the maximum value is n_max. In addition, a difference of DOD (n) and DOD (n±1) may be 1%, or may be 10%. However, a value of DOD (n), preferably, is equal to or greater than the minimum value, or equal to or less than the maximum value of the discharge depth determined by characteristics of the battery. For example, in a case where the minimum value of the discharge depth is 20% and the maximum value thereof is 100%, DOD (1), is equal to or greater than 20% and DOD (n_max) is equal to or less than 100%.

In step 903, the amount of discharge is calculated at the time of the discharge depth DOD (n) in the discharge amount calculation unit 802.

In step 904, the charge and discharge plan is drafted by considering information of the prediction value of the electric power demand and the basic cost and the unit cost of the electricity, and information of the contract electric power in the charge and discharge plan drafting unit 803. For example, when it is predicted that the peak of the electric power demand on the next day of demand prediction exceeds current contract electric power, a charge and discharge plan is drafted so as to cut the peak of the electric power demand. With this, it is possible to suppress an increment of the basic cost. In addition, for example, when the difference of the hourly electricity unit cost is large, a charge and discharge plan is drafted such that charging is performed at a time in which the electricity unit cost is relatively cheap compared to other times, and discharging is performed at a time in which the electricity unit cost is relatively high compared to other times. In addition, for example, a charge and discharge plan is drafted by considering both of reduction of the basic cost by the peak cut of the electric power demand and reduction of the amount of electric power based on the difference of electricity unit cost.

In step 905, the reduced electricity cost calculation unit 804 calculates the reduced electricity cost at the discharge depth DOD (n) based on the charge and discharge plan drafted in the charge and discharge plan drafting unit 803.

In step 906, n+1 is substituted for n in order to select the discharge depth that is calculated next.

In step 907, it is determined whether or not the n exceeds the maximum value n_max. When the n does not exceed the maximum value n_max, the processing returns to step 903, and the processing is repeated. Meanwhile, in a case where the n exceeds the maximum value n_max, the processing is finished.

By performing the above steps, it is possible to obtain the reduced electricity cost for every discharge depth.

Returning to FIG. 2, the charge and discharge depth optimization unit 210 will be described. The charge and discharge depth optimization unit 210 obtains an appropriate charge and discharge depth based on the difference between the introduction cost of battery calculated in the introduction cost analysis unit 206 and the reduced electricity cost calculated in the reduced electricity cost analysis unit 209. The difference, that is, the optimal charge and discharge depth in which cost benefits of the battery increase is calculated. Accordingly, the calculated charge and discharge depth is output to the transmission unit 211 and the display unit 212.

The transmission unit 211 transmits the charge and discharge depth obtained in the charge and discharge depth optimization unit 210 to the PCS 103, and the PCS 103 controls the battery 104.

The display unit 212 outputs and displays an optimal value of the calculated charge and discharge depth and the reduced electricity cost and the introduction cost for every discharge depth obtained in calculation processing. With this, it is possible for a customer or the like to simply verify the effect of the cost benefits of the battery. A display destination may be a screen, or may be a document.

Hereinafter, a method of obtaining an appropriate charge and discharge depth will be described by using FIG. 10 to FIG. 13.

Figure 10:
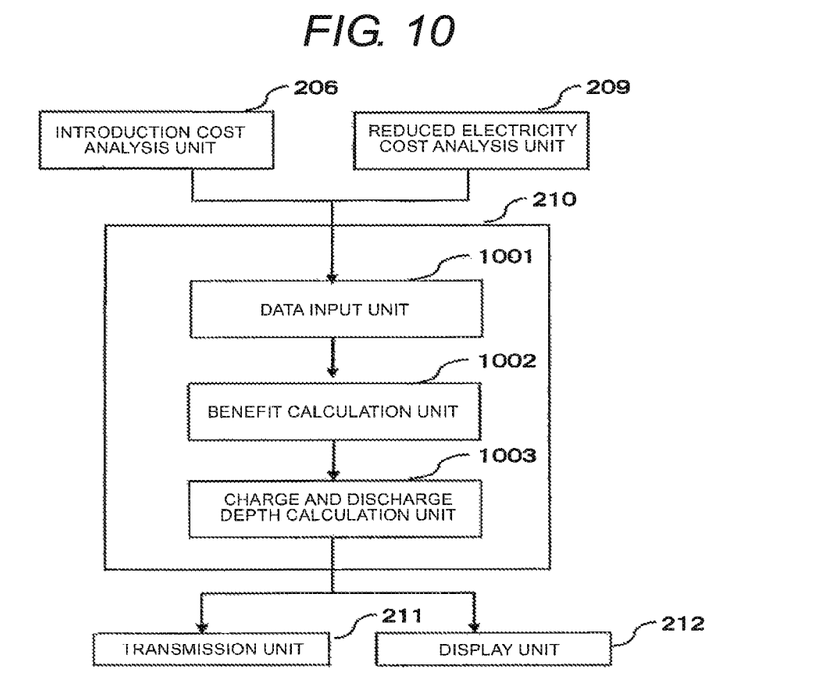
FIG. 10 is an example of a configuration diagram of a charge and discharge depth optimization unit.

FIG. 10 is an example of a configuration diagram of the charge and discharge depth optimization unit 210.

The charge and discharge depth optimization unit 210 includes a data input unit 1001, a benefit calculation unit 1002, and a charge and discharge depth calculation unit 1003.

The data input unit 1001 receives the introduction cost of battery calculated in the introduction cost analysis unit 206 and the reduced electricity cost calculated in the reduced electricity cost analysis unit 209.

Figure 12:
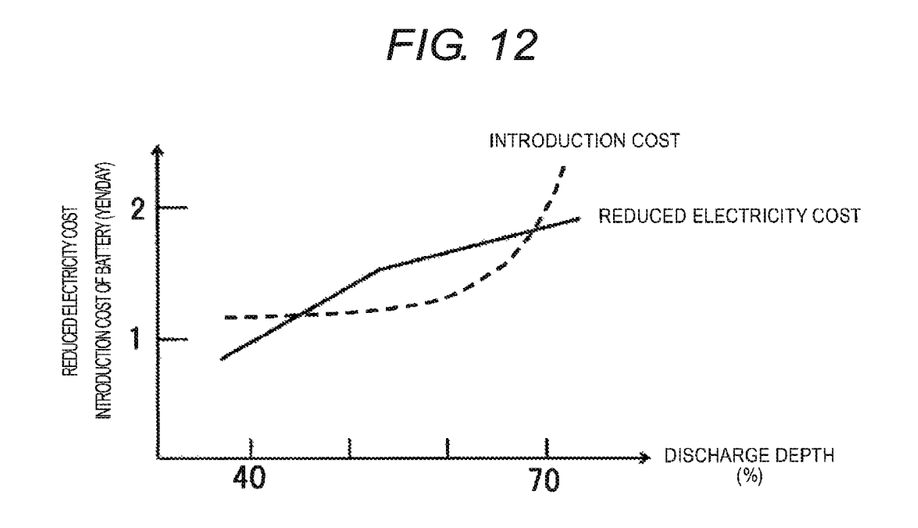
FIG. 12 is an example of a diagram illustrating a relationship between the reduced electricity cost per day and the introduction cost of the battery.
Figure 13:
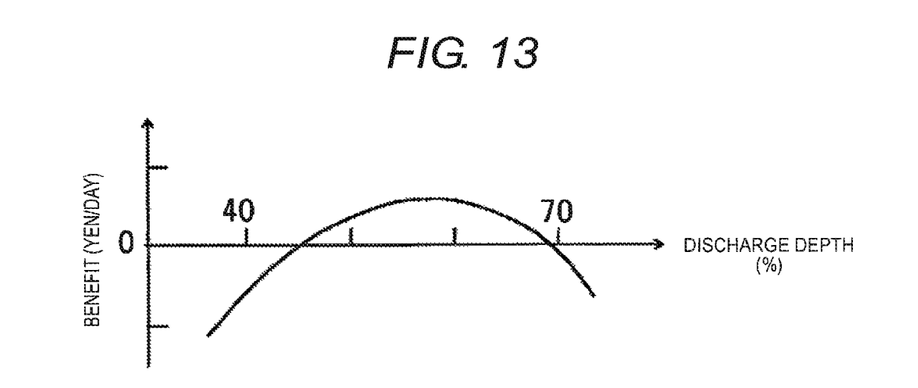
FIG. 13 is an example of a diagram illustrating benefits in the discharge depth of the battery.

The benefit calculation unit 1002 calculates benefits that are an electricity cost which can be reduced, by introducing the battery to a customer facility for every discharge depth, and charging and discharging the battery. For example, the electricity cost is a value obtained by subtracting the introduction cost from the reduced electricity cost per day. The value may be obtained by subtracting the introduction cost from the reduced electricity cost at a certain time That is, as illustrated in FIG. 12 and FIG. 13 described below, the difference is obtained based on data of the introduction cost and the reduced electricity cost for every discharge depth.

The charge and discharge depth calculation unit 1003 calculates the discharge depth in which cost benefits of the battery increase based on the benefits for every discharge depth calculated in the benefit calculation unit 1002. For example, a value obtained by maximizing benefits is calculated. In addition, there is a case where benefits become negative, that is, a loss, in many cases. At this time, the discharge depth in which the loss is minimized may be calculated. However, the discharge may not be performed. Optimal discharge depth may be calculated as compared to the effect of aging by not discharging.

The discharge depth obtained in this manner is output to the transmission unit 211 and the display unit 212.

Figure 11:
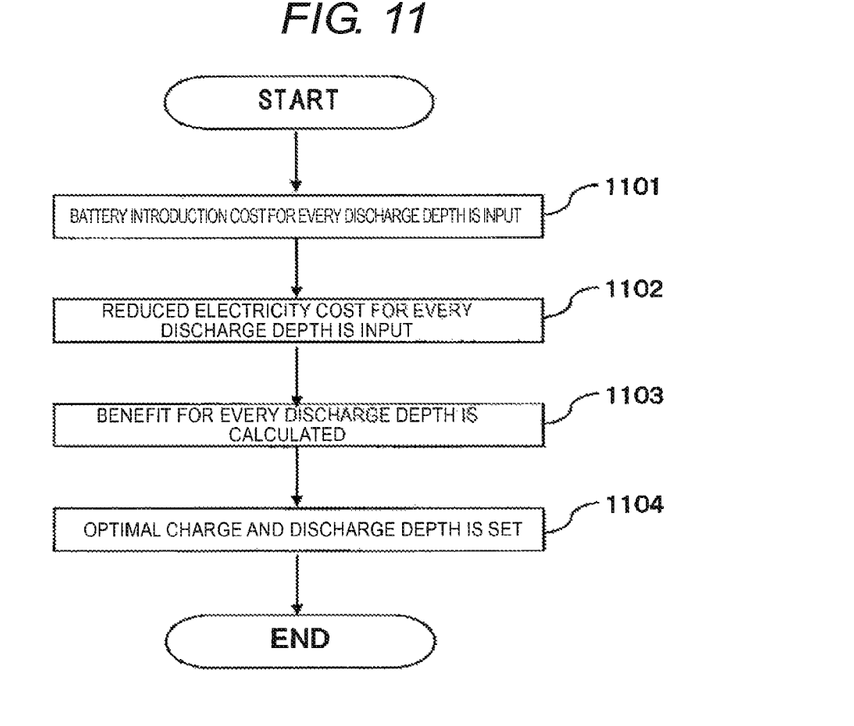
FIG. 11 is an example of a flow chart diagram illustrating processing until the charge and discharge depth optimization unit calculates optimal charge and discharge depth.

FIG. 11 is an example of a flow chart diagram illustrating processing until the charge and discharge depth optimization unit 210 calculates optimal charge and discharge depth.

In step 1101, the data input unit 1001 receives the introduction cost of battery per day calculated in the introduction cost analysis unit 206.

In step 1102, the data input unit 1001 receives, for example, the reduced electricity cost per day calculated in the reduced electricity cost analysis unit 209. Here, the reduced electricity cost may be obtained during a day, or a certain period.

Step 1101 and step 1102 are not limited to this order, and may be in a random order.

In step 1103, the benefit calculation unit 1002 calculates benefits of the customer for every discharge depth. For example, the benefit calculation unit 1002 obtains a value obtained by subtracting the introduction cost from the reduced electricity cost per day.

In step 1104, the charge and discharge depth calculation unit 1003 calculates the discharge depth in which the cost benefits of battery are maximized.

By performing the above steps, it is possible to calculate the optimal discharge depth.

FIG. 12 is a diagram illustrating a relationship between the reduced electricity cost per day and the introduction cost of the battery.

In FIG. 12, the reduced electricity cost and the introduction cost of battery obtained as described above are illustrated by the discharge depth in the horizontal axis and the reduced electricity cost and the introduction cost of battery per day in the vertical axis. The difference of the introduction cost of battery for the reduced electricity cost for every discharge depth becomes cost benefits in the battery.

FIG. 13 is a diagram illustrating benefits in the discharge depth of the battery.

FIG. 13 illustrates, as benefits per day, an amount obtained by subtracting the introduction cost of battery from the reduced (electricity cost in FIG. 9. Here, in a case where benefits are positive, since the reduced electricity cost is greater than the introduction cost of battery, the cost benefits of the battery increase. Meanwhile, in a case where benefits are negative, since the reduced electricity cost is less than the introduction cost of battery, cost benefits of the battery decrease. Therefore, it can be seen that the cost benefits of battery increase by adopting a large discharge depth that has more benefits. Here, the amount obtained by subtracting the introduction cost of battery from the reduced electricity cost is obtained as benefits. However, the discharge depth of battery may be obtained, as an amount (benefits and loss) obtained by subtracting the reduced electricity cost from the introduction cost of battery is obtained, and by increasing the cost benefits of a discharge depth in which the amount is small.

Second Embodiment

In the embodiment, an example of a battery control apparatus in which when the reduced electricity cost is calculated in the reduced electricity cost analysis unit 209, the reduced electricity cost is calculated by considering conditions from outside and charge and discharge depth is optimized, will be described.

Figure 14:
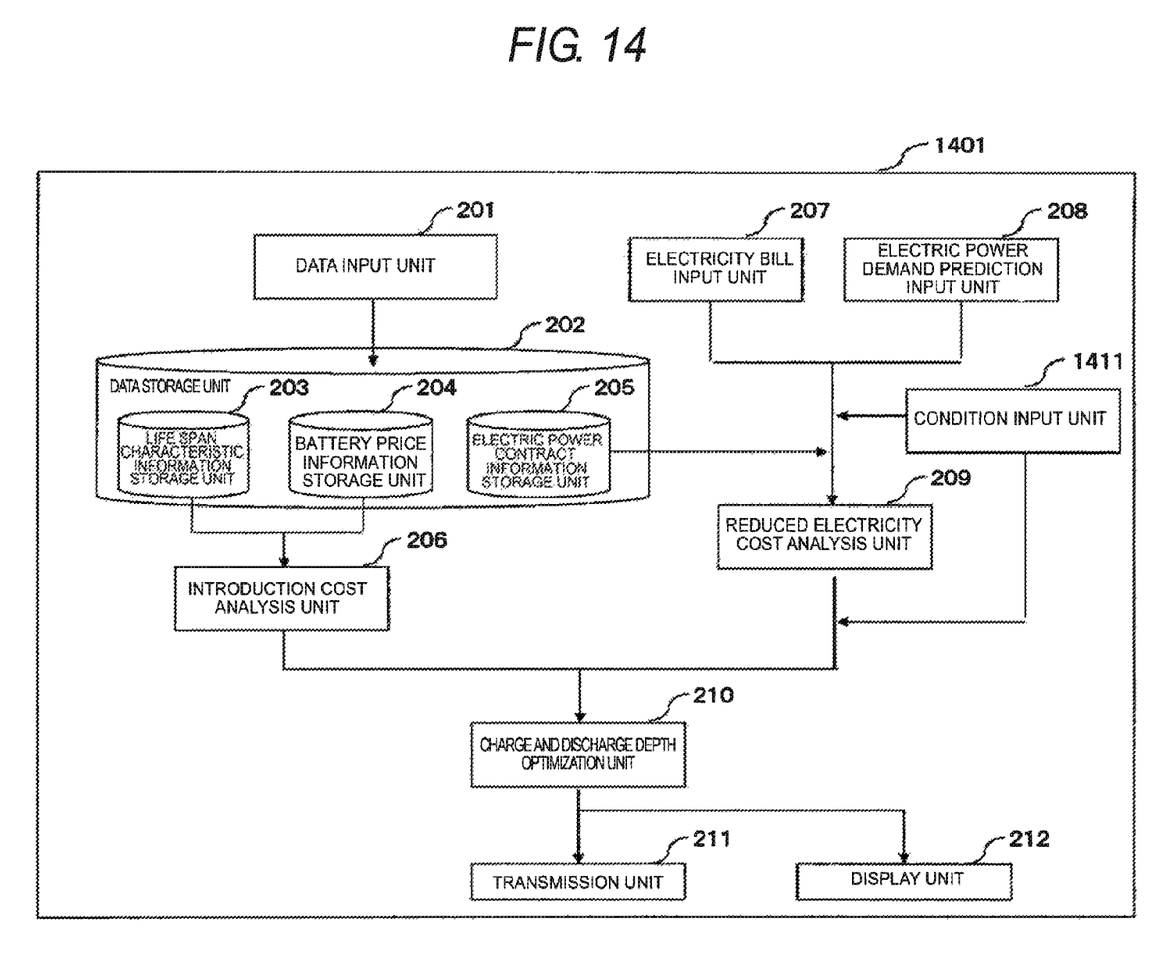
FIG. 14 is an example of a configuration diagram of a battery control apparatus in a second embodiment.

FIG. 14 is an example of a configuration diagram of a battery control apparatus 1401 in a second embodiment.

In the battery control apparatus 1401 of FIG. 14, description of parts having configurations and the same function including the same reference numerals illustrated in FIG. 2 will not be repeated. The battery control apparatus 1401 newly includes a condition input unit 1411.

The condition input unit 1411 receives a condition given from outside when the reduced electricity cost is calculated. The condition, for example, is an upper limit of the electric power demand set by the customer based on a reduction of the basic cost of electricity in the future. At this time, the charge and discharge plan of battery is drafted so as to reduce the electric power demand to equal to or less than the upper limit based on the condition, and the reduced electricity cost is calculated. Furthermore, for example, in a case where it is required to urgently reduce the electric power demand for tight electricity supply, a condition in which discharge is preferentially performed at the time of the tight electricity supply, may be implemented. In addition, for example, a condition in which priority is previously set in each device for every time and discharge amount is assigned in high priority devices, may be implemented.

The condition to be input is used as a limitation condition when the charge and discharge plan is drafted in the charge and discharge plan drafting unit 803.

In the second embodiment, it is possible to calculate the reduced electricity cost by considering a condition given from outside and to optimize the charge and discharge depth.

In addition, the condition input unit 1411 receives a condition given from outside when the charge and discharge depth is optimized. The condition, for example, may be a charge and discharge depth in which benefits become positive. At this time, the optimal charge and discharge depth may not be limited to a value obtained by maximizing benefits.

The condition to be input is used as a condition when the optimal charge and discharge depth is calculated in the charge and discharge depth calculation unit 1003.

By adopting the configuration, it is possible to optimize the charge and discharge depth by also considering a condition given from outside.

The invention is not limited to the embodiment, and may include various modification examples. For example, the embodiment described above is described in detail in order to clearly explain the invention, and is not intended to be limited to necessarily provide all the described configurations.

What is claimed is:

1. A battery control apparatus comprising:
    a reduced electricity cost analysis unit that obtains a discharge electric power cost at a discharge time and a charge electric power cost at a charge time of a battery, based on a basic cost and a unit cost of an electricity bill, and obtains a reduced electricity cost in which the charge electric power cost is subtracted from the discharge electric power cost for every discharge depth of the battery;
    an introduction cost analysis unit that calculates an introduction cost of the battery for every discharge depth of the battery; and
    a charge and discharge depth optimization unit that obtains a difference between the reduced electricity cost and the introduction cost for every discharge depth of the battery, and determines a charge and discharge depth of the battery based on the difference, wherein the discharge depth of the battery is also determined based on a comparison to an effect of aging by not discharging the battery,
    wherein the discharge of the battery is performed in the determined charge and discharge depth.

2. The battery control apparatus according to claim 1, wherein the difference is a value obtained by subtracting the introduction cost from the reduced electricity cost.

3. The battery control apparatus according to claim 2, wherein the charge and discharge depth optimization unit obtains, as an optimal value of the charge and discharge depth, the charge and discharge depth in which the difference which is an electricity bill which can be reduced by introducing the battery to a customer facility and performing charge and discharge, is large.

4. The battery control apparatus according to claim 2, wherein the charge and discharge depth optimization unit obtains, as the optimal value of the charge and discharge depth of the battery, the charge and discharge depth in which the difference is a maximum value.

5. The battery control apparatus according to claim 2, wherein the introduction cost analysis unit obtains the introduction cost for every discharge depth based on life span characteristics and an introduction cost of the battery.

6. The battery control apparatus according to claim 1, further comprising:
    a display unit that displays a value of the charge and discharge depth obtained in the charge and discharge depth optimization unit, the reduced electricity cost for every discharge depth, and the introduction cost of the battery for every discharge depth.

7. The battery control apparatus according to claim 1, wherein the difference is a value obtained by subtracting the reduced electricity cost from the introduction cost, and
    wherein the charge and discharge depth in which the difference is small is calculated as an optimal value of the charge and discharge depth.

8. A battery control system comprising:
    a battery control apparatus including
        a reduced electricity cost analysis unit that obtains a discharge electric power cost at a discharge time and a charge electric power cost at a charge time of a battery, based on a basic cost and a unit cost of an electricity bill, and obtains a reduced electricity cost in which the charge electric power cost is subtracted from the discharge electric power cost for every discharge depth of the battery,
        an introduction cost analysis unit that calculates an introduction cost of the battery for every discharge depth of the battery, and
        a charge and discharge depth optimization unit that obtains a difference between the reduced electricity cost and the introduction cost for every discharge depth of the battery, and determines a charge and discharge depth of the battery based on the difference wherein the discharge depth of the battery is also determined based on a comparison to an effect of aging by not discharging the battery;
    the battery; and
    a device that receives electric power from the battery.

9. A method for controlling a battery comprising:
    obtaining a discharge electric power cost at a discharge time and a charge electric power cost at a charge time of a battery based on a basic cost and a unit cost of an electricity bill;
    obtaining a reduced electricity cost obtained by subtracting the charge electric power cost from the discharge electric power cost for every discharge depth of the battery;
    calculating an introduction cost of the battery for every discharge depth of the battery;
    obtaining a difference between the reduced electricity cost and the introduction cost for every discharge depth of the battery;
    determining a charge and discharge depth of the battery based on the difference wherein the discharge depth of the battery is also determined based on a comparison to an effect of aging by not discharging the battery; and
    discharging the battery at the charge and discharge depth.

* * * * *